May 29, 1945.   W. W. KRAFT   2,376,923

HYDROCARBON FRACTIONATION

Filed Dec. 31, 1941

INVENTOR
Wheaton W. Kraft
BY
ATTORNEY

Patented May 29, 1945

2,376,923

UNITED STATES PATENT OFFICE 2,376,923

HYDROCARBON FRACTIONATION

Wheaton W. Kraft, Scarsdale, N. Y., assignor to The Lummus Company, New York, N. Y., a corporation of Delaware Application December 31, 1941, Serial No. 425,159

4 Claims. (Cl. 196—94)

This invention relates to an improved fractionating method and apparatus and particularly to an improved shower deck construction and arrangement especially adapted to the fractionation of hydrocarbons and the like.

In the fractionation of hydrocarbon mixtures such as crude petroleum and the like in a fractionating column, the separation of water from liquid hydrocarbons presents difficulties especially where the overhead has a boiling range below the boiling point of water at the particular operating pressure. The problem of separating the water from the oil is obviously magnified when both materials are present in liquid form within the fractionating column. This problem usually arises where the charge, for example, a crude, contains appreciable quantities of water or where steam is employed for stripping purposes.

Accordingly, it is the purpose of this invention to provide simple and efficient method and means for separating and removing the condensed water from within a fractionating column in which a hydrocarbon mixture is undergoing fractionation.

More specifically, it is intended to provide an improved form and arrangement of a shower tray which will facilitate the desired separate removal of water from the column.

In accordance with this invention, the imperforate liquid-collecting portion of the shower trays in at least the upper portion of a fractionating column is formed to provide a trough or gutter adjacent the weir separating such portion from the perforated shower-forming portion, and suitable connections are provided for removing from the trough of each tray out through the column wall the water that separates therein from the hydrocarbon condensate.

Figure 1:
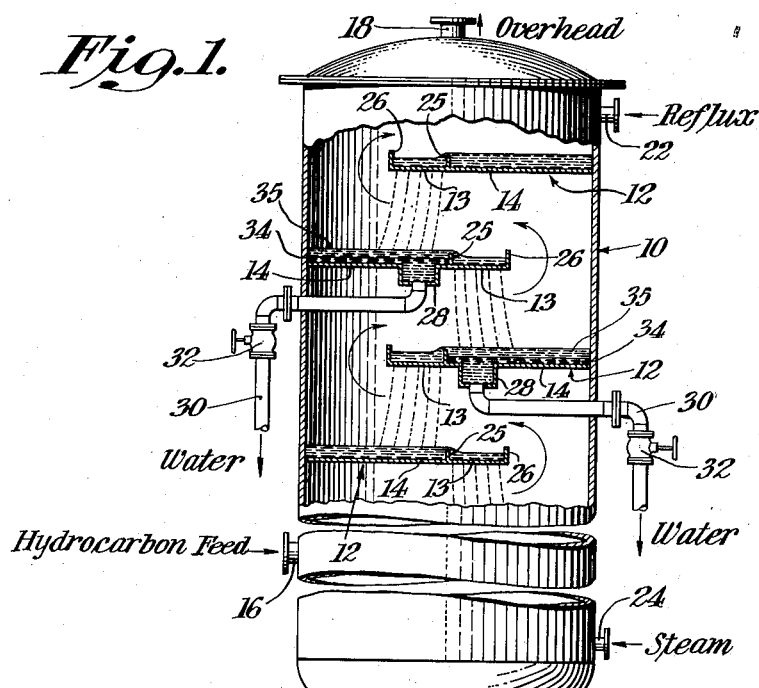
Figure 2:
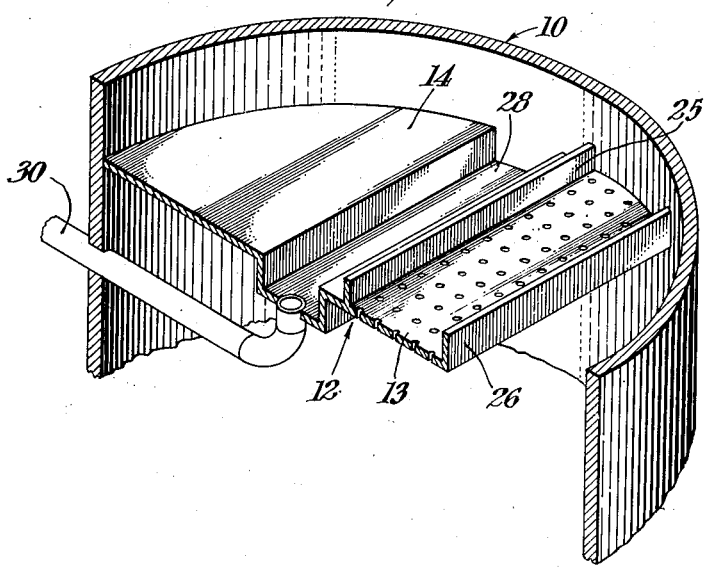

Other features of novelty contributing to the efficiency of separation of the condensed water from the hydrocarbon liquid and its removal from the fractionating apparatus will appear in the following detailed description of the invention taken in connection with the accompanying drawing, in which:

Fig. 1 is an elevation partly in section of a fractionating column provided with my improved shower deck; and Fig. 2 is an enlarged isometric view partly in horizontal and partly in vertical section showing one of the improved shower trays and its relation to the column.

With reference to the drawing, 10 indicates generally a fractionating column or tower containing at least in the upper portion thereof vertically spaced shower trays 12 comprised of the conventional perforated shower-forming and imperforate liquid-collecting portions 13 and 14, respectively. The hydrocarbon material to be fractionated enters the lower portion of column 10 at 16, and the overhead fraction is removed from the upper end of the column at 18. As indicated, the bottoms fraction is removed from the bottom of column 10 at 20. A suitable refluxing medium is introduced into the upper portion of column or tower 10 at 22. Where stripping is necessary or desirable, the required stripping medium such as steam may be introduced into the column, as at 24, adjacent the lower end thereof.

As is well known, the horizontally extending shower trays are desirably staggered alternately to define a sinuous vapor path through this portion of the column. The imperforate liquid-collecting portion and the perforated or foraminous spray-forming portion are separated by the customary weir 25 in order that the hydrocarbon condensate collected on the imperforate portion can be discharged in an even shower downwardly through the perforated spray-forming portion. Alternate trays preferably extend from opposite sides of the column across a major portion thereof and are desirably arranged so that the spray-forming portion of one overlies the liquid-collecting portion of the one next below. By this arrangement the rising vapors are forced to ascend in a tortuous path between the trays, and intimate contact between the showering condensate and the rising vapors occurs repeatedly between each pair of shower decks. Each deck is also provided with the usual outer weir 26 to maintain the liquid on the shower-forming portion thereof.

According to my invention, the liquid-collecting portion 14 is formed to provide a fairly deep trough or gutter 28 having a valved drain line 30 extending from its bottom to without the tower 10. The collecting trough or gutter 28 may be made in any desired shape, but preferably it is rectangular in shape and parallel to weir 25 as shown in the drawing so that it can readily extend across the column; it is also desirably disposed but a short distance from weir 25. Accordingly, when water condenses out of the rising vapors within the column, it can be readily and quickly separated from the hydrocarbon condensate simultaneously formed and can be collected in trough 28 for continuous or intermittent removal as desired through drain line 30 by proper setting of valve 32. In this manner, interference of the condensed water with the proper functioning of the shower decks is reduced to a minimum.

In the operation of my invention, the hydrocarbon vapors undergoing fractionation pass upwardly through tower 10 in a winding path through the shower provided continuously by the perforated portion of each tray. The desired low-boiling fraction is discharged as overhead at 18 to a suitable condenser (not shown). During this vapor flow, which proceeds under controlled conditions of temperature and pressure, the higher boiling components are condensed out and are collected on the imperforate portion of each tray. Where water vapor is admixed with the hydrocarbon vapors and the boiling range of the overhead fraction is lower than the boiling point of water, the water vapor will be condensed out along with the hydrocarbon vapors. This water may be contained in the initial hydrocarbon material to be fractionated or may be introduced into the column as stripping steam. The condensed water, which is immiscible with and heavier than the hydrocarbon condensate, collects as a lower stratum 34 on the imperforate portion and in the trough portion of the shower decks or trays, and the lighter upper hydrocarbon layer 35 flows over the respective weirs and advances downwardly in shower form from tray to tray. The lower immiscible water layer is removed through the valved drain lines 30 from the bottom of the shower trays and passes to a suitable decanting tank (not shown). In a particular application of my invention, a relatively complete separation of condensed water from oil was successfully accomplished within the column in the fractionation under pressure of a crude to produce a naphtha boiling below 260° F.

It will be appreciated that my invention is not necessarily limited to the fractionation of hydrocarbons but is also applicable to the fractionation of any complex liquid mixture in the presence of a heavier immiscible or substantially immiscible liquid to produce an overhead fraction having a boiling range lower than the boiling range of the immiscible liquid. In such case also, the condensate mixture stratifies into two layers, the lower of which, comprising the heavier immiscible liquid, is continuously withdrawn from the shower decks out through the fractionating column wall for suitable disposal so as not to interfere with the fractionation of the complex liquid mixture.

My invention is not necessarily limited to the particular shower deck arrangement shown. Any fractionating construction comprising means to discharge a liquid downwardly preferably in the form of a shower and an imperforate liquid-collecting portion, on which the mixed condensate can stratify and from which the heavier, relatively immiscible liquid can be separately withdrawn, is satisfactory. Furthermore, not all the trays even in the upper portion of the column need be provided with the trough. The number of trays so equipped will be governed by the particular operating conditions.

Those versed in this art will appreciate that various changes may be made in the details of the method and of the construction and arrangement of parts without departing from the spirit of the invention and the scope of the appended claims.

The invention having been thus described, what is claimed as new and desired to be secured by Letters Patent of the United States is:

1. In a fractionating tower, a flat horizontal shower deck within the tower having an imperforate liquid-collecting body portion extending from one side of the tower approximately halfway to the opposite side of the tower and occupying approximately one-half of the area of the tower cross section and a perforated spray-forming marginal portion extending from said imperforate portion part way to the opposite side of the tower, said portions of the deck being entirely offset horizontally from each other, a weir borne by said deck and extending approximately diametrically across the tower and separating said imperforate and perforated portions of the deck for stratification of downflowing condensed immiscible liquids upon said imperforate portion of the deck, a trough borne by said deck and forming an elongated depression in the bottom of the imperforate portion and parallel and adjacent to said weir and in which the lower liquid stratum can accumulate, means for withdrawing the accumulated liquid from said depression and conducting it out through the tower, and spray-forming means within the tower above the shower deck and arranged to discharge the down-flowing condensed liquids upon said imperforate portion only of the deck.

2. In a fractionating tower, a plurality of flat horizontal shower decks vertically spaced within the tower, each deck having an imperforate liquid-collecting body portion extending from one side of the tower approximately halfway to the opposite side of the tower and occupying approximately one-half of the area of the tower cross section and a perforated spray-forming marginal portion extending from said imperforate portion part way to the opposite side of the tower, said portions of the deck being entirely offset horizontally from each other, a weir borne by each deck and extending approximately diametrically across the tower and separating said imperforate and perforated portions of the deck for stratification of downflowing condensed immiscible liquids upon said imperforate portion of the deck, a trough borne by each deck and forming an elongated depression in the bottom of the imperforate portion and parallel and adjacent to said weir and in which the lower liquid stratum can accumulate, and means for withdrawing the accumulated liquid from said depression and conducting it out through the tower, said decks being arranged in a staggered relation with the imperforate portion of one deck in a position to receive all of the liquid showered downwardly from the perforated portion of the next upper deck.

3. The method of fractionating a hydrocarbon mixture in the presence of water vapor wherein the desired overhead fraction has a boiling range lower than the boiling point of water at the particular operating pressure, which comprises effecting condensation of the water vapor along with the vaporous hydrocarbons of corresponding boiling range within a fractionating tower, showering the resulting condensate downwardly within the tower, catching and collecting all of the shower upon a collecting surface of relatively large area within the tower for stratification of the condensate upon said surface, evenly overflowing the upper hydrocarbon stratum of the collected condensate along a line approximating in length the major dimension of said area and showering it downwardly within the tower, smoothly withdrawing the lower water stratum downwardly from said surface along a line approximating in length the major dimension of said area, and conducting the so-withdrawn water from the tower.

4. In a fractionating tower a plurality of flat horizontal shower trays vertically spaced within the tower and each comprising a perforated spray-forming portion, an imperforate liquid-collecting portion on which downflowing condensed immiscible liquids can stratify into layers, said portions of the deck being entirely offset horizontally from each other, said liquid-collecting portion having a trough forming a depression in the bottom thereof and in which the lower liquid layer accumulates, said trough being spaced transversely thereof materially inwardly from the inner wall of the tower and a weir separating said portions; means for discharging downflowing condensed liquids in a shower, from an upper tray, onto said imperforate portion only of the succeeding lower one of said trays; and means for withdrawing the accumulated liquid from said depression of each tray and conducting the withdrawn liquid from the tower, said trays being arranged in a staggered relation to each other with the imperforate portion of one tray in a position to receive all of the liquid showered downwardly from the perforated portion of the next upper tray.

WHEATON W. KRAFT.